(12) United States Patent
Shusterman et al.

(10) Patent No.: US 12,199,849 B2
(45) Date of Patent: Jan. 14, 2025

(54) METHODS AND DEVICES FOR ADAPTIVE RATE BASED LATENCY TOLERANCE REPORTING

(71) Applicant: Intel Corporation, Santa Clara, CA (US)

(72) Inventors: Michael Shusterman, Portland, OR (US); Rom Leor, Haifa (IL); Shimon Lavi, Haifa (IL); Marina Sharkansky, Haifa (IL); Oded Liron, Givat-Ada (IL); Nadav Szanto, Haifa (IL); Ronen Levi, Netanya (IL)

(73) Assignee: INTEL CORPORATION, Santa Clara, CA (US)

( * ) Notice: Subject to any disclaimer, the term of this patent is extended or adjusted under 35 U.S.C. 154(b) by 877 days.

(21) Appl. No.: 17/128,327

(22) Filed: Dec. 21, 2020

(65) Prior Publication Data

US 2022/0200881 A1 Jun. 23, 2022

(51) Int. Cl.
*H04L 43/0852* (2022.01)
*H04W 24/08* (2009.01)

(52) U.S. Cl.
CPC ......... *H04L 43/0852* (2013.01); *H04W 24/08* (2013.01)

(58) Field of Classification Search
CPC .............. H04L 43/0852; H04W 24/08; H04W 52/0251; H04W 52/0225; G06F 1/3206
See application file for complete search history.

(56) References Cited

U.S. PATENT DOCUMENTS

| | | | |
|---|---|---|---|
| 8,767,752 B1* | 7/2014 | Tripathi | H04L 47/12 370/401 |
| 2007/0086379 A1* | 4/2007 | Takayanagi | H04W 88/08 370/329 |
| 2009/0249103 A1* | 10/2009 | Jeyaseelan | G06F 1/3203 713/300 |
| 2010/0169684 A1 | 7/2010 | Jeyaseelan et al. | |
| 2017/0171818 A1* | 6/2017 | Agarwal | H04W 72/23 |
| 2021/0306271 A1* | 9/2021 | Xin | H04L 47/6275 |

FOREIGN PATENT DOCUMENTS

| | | | |
|---|---|---|---|
| EP | 2865224 A2 | 4/2015 | |
| WO | WO-2014004506 A2 * | 1/2014 | ........ H04W 52/0203 |

OTHER PUBLICATIONS

Extended Search Report for the European Patent Application No. 21196264.2, dated Mar. 10, 2022, 7 pages (For reference purposes only).

* cited by examiner

*Primary Examiner* — Ayanah S George
(74) *Attorney, Agent, or Firm* — VIERING, JENTSCHURA & PARTNER MBB

(57) ABSTRACT

A wireless communication device including one or more processors configured to determine a device state; determine a data rate of a signal; determine a latency tolerance value based on the data rate and the device state; and generate a message comprising the latency tolerance value. The wireless communication device may further be configured to determined if the latency tolerance value is a duration associated with a device reception or transmission.

15 Claims, 10 Drawing Sheets

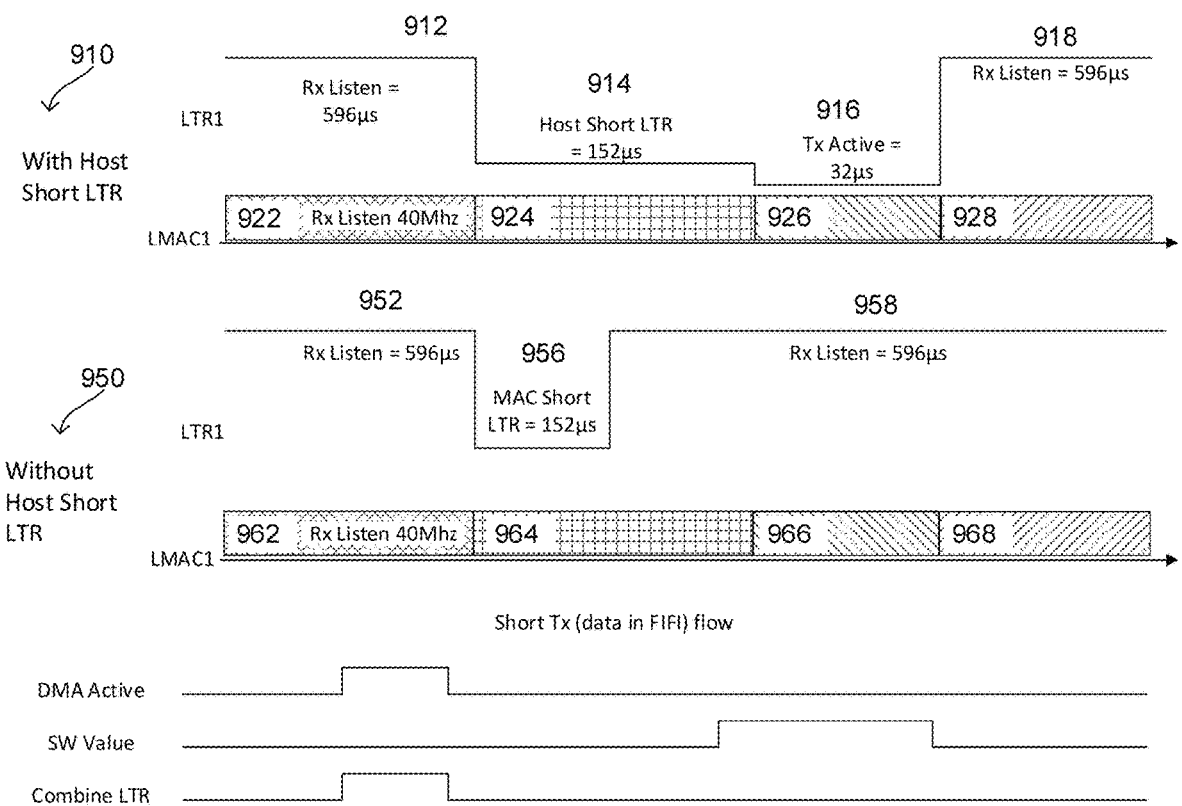

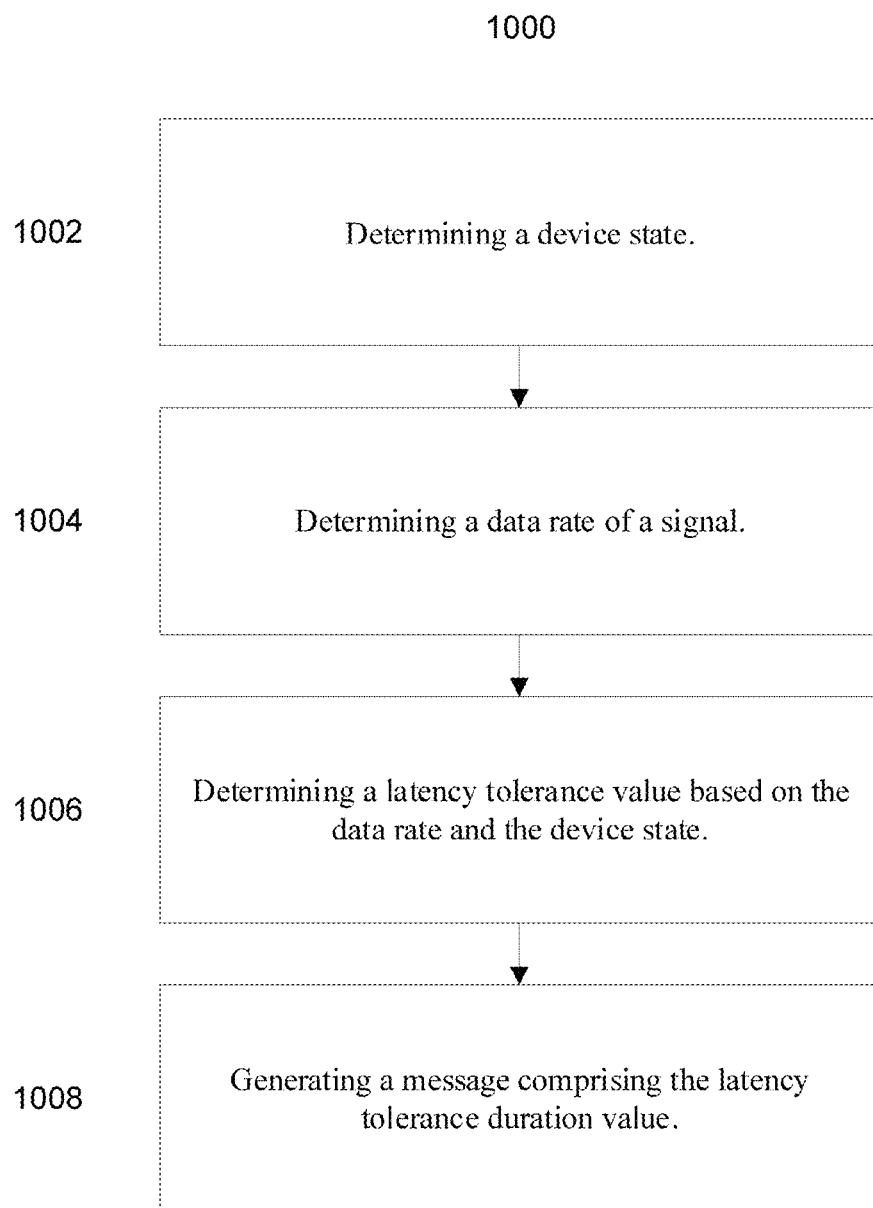

METHODS AND DEVICES FOR ADAPTIVE RATE BASED LATENCY TOLERANCE REPORTING

TECHNICAL FIELD

Various aspects relate generally to methods and devices for latency tolerance reporting (LTR) in wireless communications. LTR is a mechanism of wireless communication for reporting the service latency requirements for memory reads and writes to main system memory.

BACKGROUND

LTR may increase power requirements for a wireless communication device. Conversely, the platform or system on chip (SOC) including a wireless communication device may constrain power management policies to manage service requirements of the wireless communication device. For example, the central platform resources may consider service requirements when managing power allocation. Platform resources may include, but not limited to, the memory controller, peripheral component interconnect (PCI)e root complex, internal SOC interconnects, and snoop resources. Wireless communication technology of the wireless communication device may include Wireless LAN (WLAN or Wi-Fi), Wireless WAN (WWAN or LTE/5GNR).

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 9 shows exemplary improvements in power consumption based on determined LTR duration according to some aspects.

FIG. 10 shows an exemplary method of determining an LTR duration based on a determined data rate according to some aspects

DESCRIPTION

Figure 1:
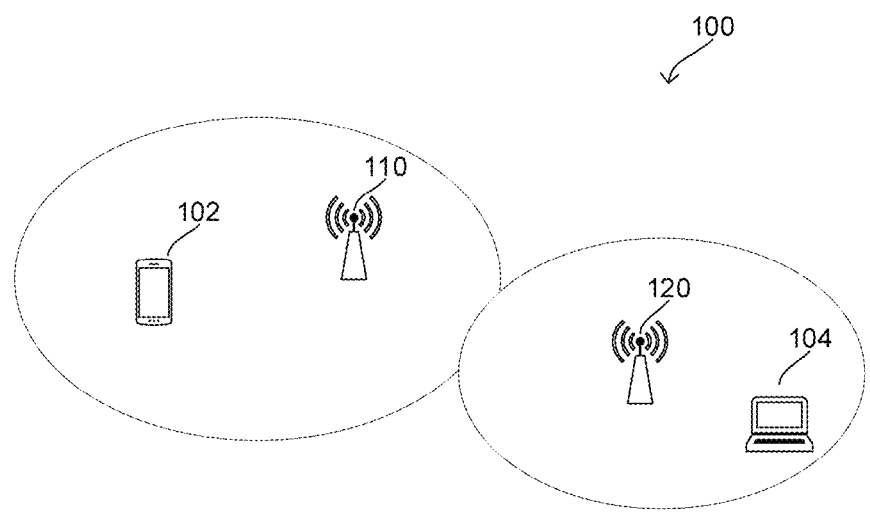
FIG. 1 shows an exemplary radio communication network according to some aspects.

The following detailed description refers to the accompanying drawings that show, by way of illustration, specific details and aspects of embodiments in which the disclosure may be practiced.

The word "exemplary" is used herein to mean "serving as an example, instance, or illustration." The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "reduced subset" refers to a subset of a set that contains less than all elements of the set. Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax), 5G New Radio (NR), for example, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the wireless transmission of radio signals) and logical transmission (e.g., the transmission of digital data over a logical software-level connection). For example, a processor (or controller or physical layer) may transmit or receive data over a software-level connection with another processor (or controller or physical layer) in the form of radio signals, where the physical transmission and reception is handled by radio-layer components such as RF transceivers and antennas, and the logical transmission and reception over the software-level connection is performed by the processors.

Many wireless communication technologies use beamforming to increase link strength between transmitter and receiver. The Third Generation Partnership Project's (3GPP) Fifth Generation (5G) New Radio (NR) standard, for example, includes mechanisms for beamforming in both the transmit and receive directions. Focusing on the terminal side, a terminal device (e.g., a UE) may identify a receive antenna beam and a transmit antenna beam for a given network access node (e.g., gNodeB). In the receive direction, the terminal device can then increase link strength by receiving signals from the network access node with the receive antenna beam. Similarly, in the transmit direction the terminal device can boost link strength by transmitting signals to the network access node with the transmit antenna beam.

The term "wireless network interface card" (WNIC) is a wireless communication device with a network interface controller which connects to a wireless network, rather than a wired network.

The terms "C-states" and "P-states" may refer to states of a device such as a WNIC or CPU. C-states are idle states and P-states are operational states. Reducing the operating frequency reduces the speed at which the processor operates, and so reduces the energy usage per second (i.e. power). Reducing the voltage decreases the leakage current from a device's transistors, making the device more energy efficient resulting in further gains. The net result is a significant reduction in the energy usage per second of the processor. On the other hand, an application will take longer to run. This may or may not be a problem from a power perspective. C-states and P-states are also orthogonal meaning each can vary independently of the other.

The term "D-states" may refer to a power state of a device such as a WNIC. A device power state describes its power state of a device independently of the other devices in a larger device. Device power states are named D0, D1, D2, and D3. D0 is the fully on state, and D1, D2, and D3 are low-power states. The state number is inversely related to power consumption: higher numbered states use less power.

The LTR has direct impact on power management of a wireless communication device or WNIC. The power management may be based on the device C-state residencies. For example, overly pessimistic LTR, based on the worst case WNIC assumptions, leads to sub-optimal power management decisions and shallow C-state residencies. This is because the SOC resources are being configured to honor the reported latency constraints of the WNIC and must remain alert for any incoming or outgoing memory transaction. On the other hand, overly optimistic, longer than allowed Latency Tolerance report, may lead to incorrect WNIC operation, and underrun/overrun of the internal buffers. Methods for improved LTR to improve power consumption in a wireless communication device are disclosed.

Figure 2:
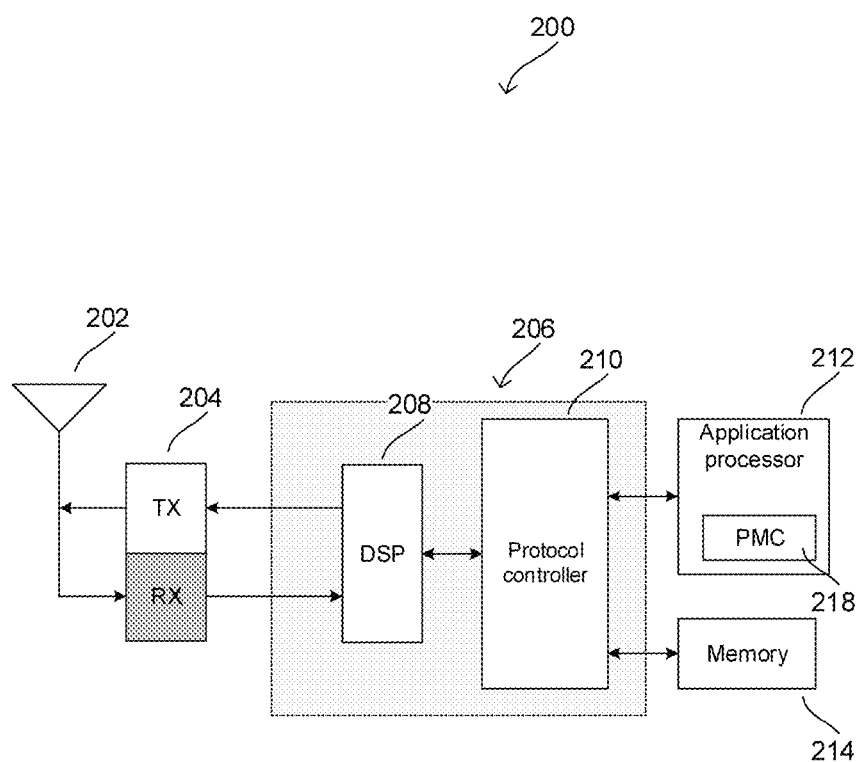
FIG. 2 shows an exemplary internal configuration of a terminal device according to some aspects.

FIGS. 1 and 2 show a general network and device architecture for wireless communications. FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/Wi-Fi, Bluetooth, 5G NR, mmWave, WiGig, etc.), these examples are illustrative and may be readily applied to any other type or configuration of radio access network. The number of network access nodes and terminal devices in radio communication network 100 is exemplary and is scalable to any amount.

In an exemplary short-range context, network access node 110 and 120 may be access points (APs, e.g., WLAN or Wi-Fi APs), while terminal device 102 and 104 may be short range terminal devices (e.g., stations (STAs)). Network access nodes 110 and 120 may interface (e.g., via an internal or external router) with one or more external data networks. In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data).

The radio access network and core network of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, Wi-Fi, mmWave, 5G NR, and the like, any of which may be applicable to radio communication network 100.

FIG. 2 shows an exemplary internal configuration of terminal device 200 according to some aspects, which may include antenna system 202, radio frequency (RF) transceiver 204, baseband modem 206 (including digital signal processor 208 and protocol controller 210), application processor 212, and memory 214. Terminal device 200 may be any one of terminal device 102 or 104. Although not explicitly shown in FIG. 2, in some aspects terminal device 200 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 200 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 200 shown in FIG. 2 depicts only a single instance of such components.

Terminal device 200 may transmit and receive wireless signals with antenna system 202. Antenna system 202 may be a single antenna or may include one or more antenna arrays that each include multiple antenna elements. For example, antenna system 202 may include an antenna array at the top of terminal device 200 and a second antenna array at the bottom of terminal device 200. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specifically execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 200 may be configured to operate according to one or more radio communication technologies. Digital signal processor 208 may be responsible for lower-layer processing functions (e.g. Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 200 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 200 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 200 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 200 may also include application processor 212 and memory 214. Application processor 212 may be a CPU, and may be configured to handle the layers above the protocol stack, including the transport and application layers. Application processor 212 may be configured to execute various applications and/or programs of terminal device 200 at an application layer of terminal device 200, such as an operating system (OS), a user interface (UI) for supporting user interaction with terminal device 200, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may be a memory circuitry or storage element of terminal device 200, such as a hard drive or another such permanent memory device. Although not explicitly depicted in FIG. 2, the various other components of terminal device 200 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select available network access nodes in order to maintain a strong radio access connection with the radio access network of radio communication network 100. For example, terminal device 102 may establish a radio access connection with network access node 110 while terminal device 104 may establish a radio access connection with network access node 120. If the current radio access connection degrades, terminal devices 102 or 104 may seek a new radio access connection with another network access node of radio communication network 100; for example, terminal device 104 may move from the coverage area of network access node 120 into the coverage area of network access node 110. As a result, the radio access connection with network access node 120 may degrade, which terminal device 104 may detect via radio measurements such as signal strength or signal quality measurements of network access node 120. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

This disclosure provides various aspects for devices and methods for rate-based latency tolerance reporting methods in a wireless communication system. Semi-static LTR based on the highest possible data rate for WNIC throughput is power resource intensive. For example, 2 LTR durations for a WNIC, a constrained fixed LTR duration for scenarios when the WNIC is active and an unconstrained LTR duration for scenarios when the WNIC is inactive, such as a "sleep" state. Additionally, an LTR duration may be based on the maximum possible WNIC throughput for a given technology. For example, a WNIC capable of 2.4 Gbit/sec throughput and having internal buffers of 64 Kbyte, could report a 200 uSec LTR. However, in many scenarios, this duration is not enough to achieve best platform power saving state. In addition, such large buffers are not always available, especially considering multiple quality of service queues (i.e., requiring a dedicated FIFO per QoS queue).

During operation, actual WNIC throughput rates may be much lower than their theoretical maximum. If, LTR durations are set according to the previously described approaches, the platform may operate at a standby state or shallow device C-state, consuming more power than necessary for given real-life scenarios.

Figure 3:
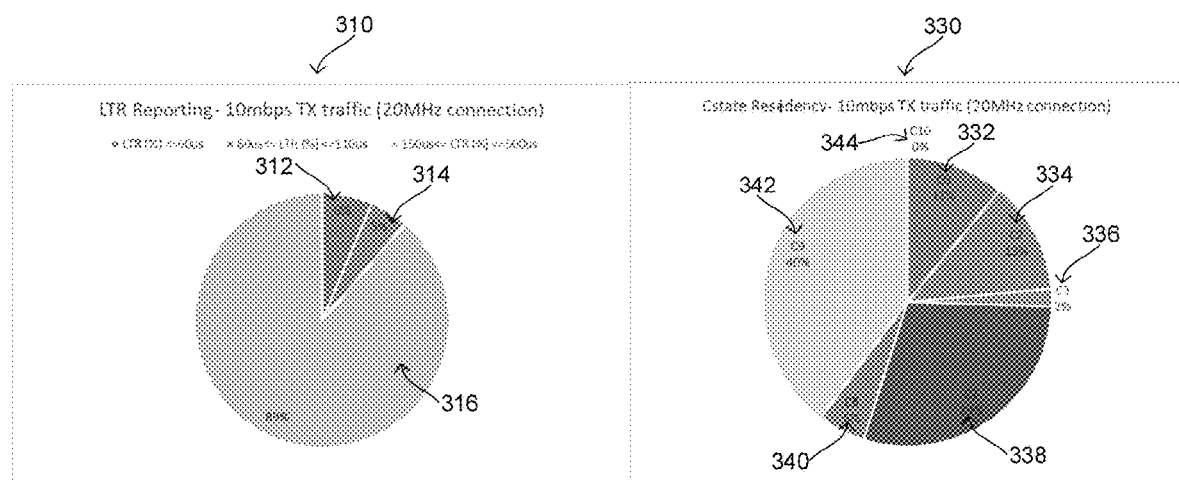
FIG. 3 shows an exemplary power consumption when the LTR duration is based on a maximum WNIC data rate according to some aspects.

FIG. 3 shows power consumption when the LTR duration is based on a maximum WNIC throughput. For example, a WNIC with 10 Mbit throughput and its associated device C-state residencies. Graph 310 shows percentages of transmission traffic a WNIC for different LTR durations. For example, 6% 312 of traffic has an LTR duration of less than or equal to 60 microseconds, 5% 314 has an LTR duration between 60 and 110 microseconds, and 89% 316 has an LTR duration between 150 and 500 microseconds. Chart 330 shows the C-states for the same WNIC. For example, C0 state 332 makes up 11% of the WNIC's operating time. Similarly, C2 state 334 makes up 13%, C3 state 336 makes up 2%, C7 state 338 makes up 29%, C8 state makes up 5%, C9 state makes up 40%, and C10 state 344 makes up 0% of the WNIC's time.

Please note, the lowest device state C10 is never achieved, despite the relatively low throughput.

Latency tolerance calculation based on the actual data rate, as opposed to the maximum theoretical rate, is disclosed. Various techniques for extending the LTR may be applied. For example, using physical medium overhead and air protection duration to extend LTR.

Figure 4:
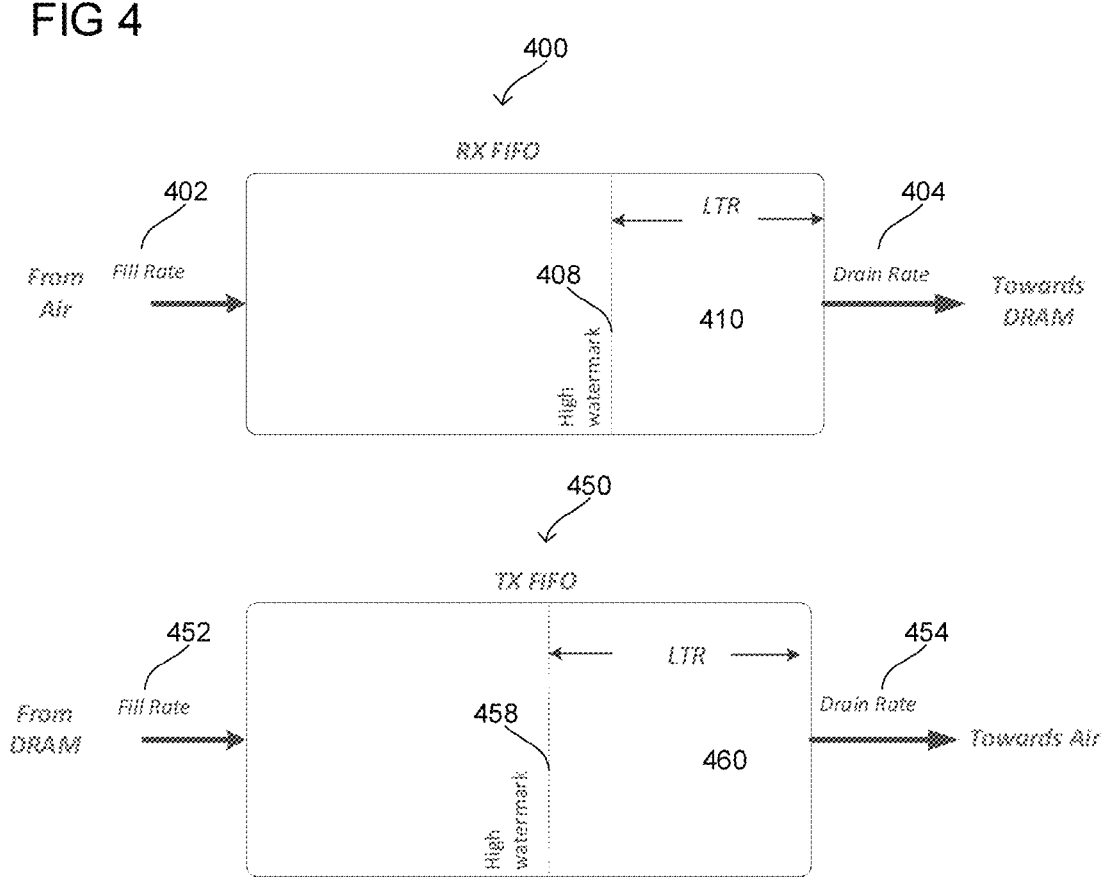
FIG. 4 shows exemplary LTR calculation based on actual data rate according to some aspects.

FIG. 4 shows an LTR calculation based on actual data rate after crossing a watermark threshold. Data buffer 400 may be a first-in-first-out (FIFO) queue for wireless communication reception. Data buffer 450 may be a first-in-first-out (FIFO) queue for wireless communication transmission.

Buffer 400 may receive data at fill rate 402 from an air medium. As data accumulates in FIFO queue of buffer 400 at fill rate 402, it may reach the watermark 408. A method for calculating LTR 410 may use the data rate 402 and/or data rate 404 to determine the duration of LTR 410. The buffered data may be drained at data rate 404 and written to memory.

Buffer 450 may receive data at fill rate 452 from a memory. As data accumulates in FIFO queue of buffer 450 at fill rate 452, it may reach the watermark 458. A method for calculating LTR 460 may use the data rate 452 and/or data rate 454 to determine the duration of LTR 460. The buffered data may be drained at data rate 454 and transmitted to an air medium.

After accumulated data crosses a watermark threshold in a data buffer queue, latency tolerance may be calculated. By the time it takes to fill the FIFO, for reception, or drain the FIFO, for transmission, the LTR is already calculated. For the purposes of this disclosure, the DRAM data rate is assumed to be much higher than the air data rate. However, it may take up to the duration of LTR for the platform to wake from a sleep state and start draining or filling the FIFO.

Extending the LTR as much as possible using multiple techniques may achieve the best platform power efficiency, in the given workload. Longer LTR durations are associated with more power efficient WNICs.

Optimum power efficiency may be achieved when in addition to setting sufficiently long LTR duration, there is no platform activity. In other words, long LTRs with frequent platform wakes may impact the platform power breakeven point and should be considered.

The best platform power breakeven point is when the idle duration is approximately 3 times the duration of reported latency tolerance. However, this disclosure focuses on the techniques to achieve the longest possible LTR duration and not on the platform power breakeven point.

Methods for extending LTR duration may send transaction layer packet (TLP) messages via a PCIe lane. The TLP messages may include LTR duration values based on various wireless traffic parameters, such as associated throughput, actual throughput, band, air-protection, etc.

Figure 5:
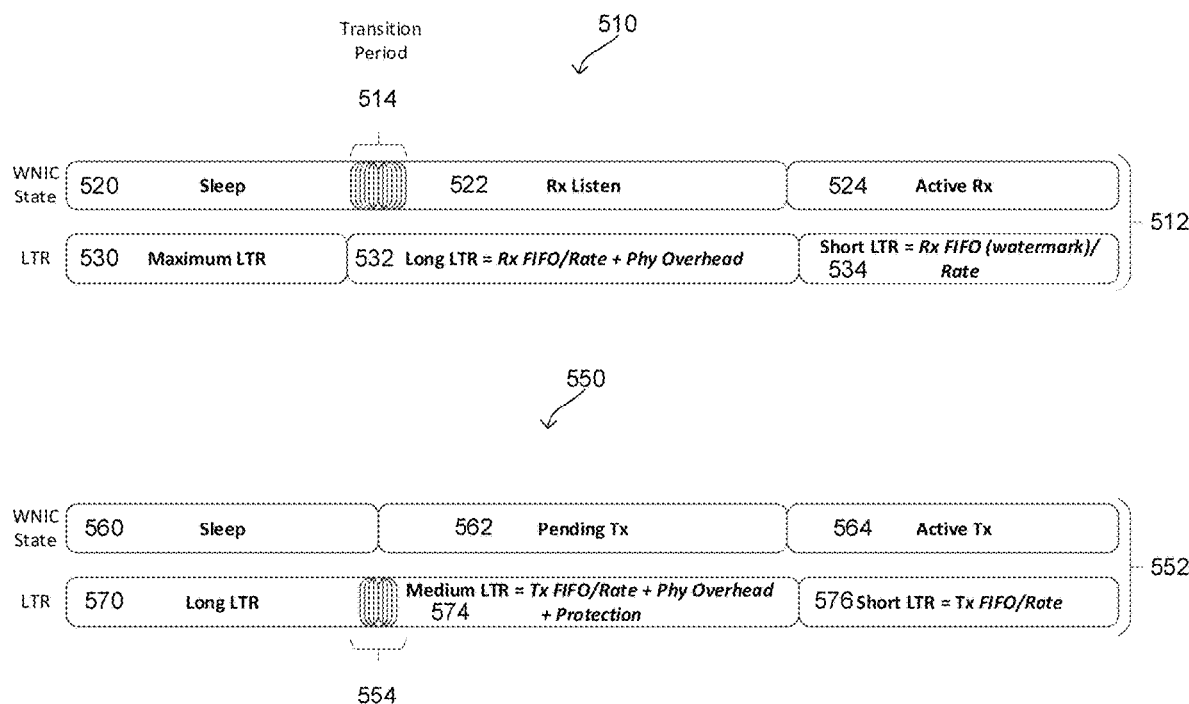
FIG. 5 shows exemplary LTR durations for different WNIC states in transmission and reception states according to some aspects.

FIG. 5 shows exemplary LTR durations for different WNIC states for both transmission and reception. A WNIC may include both receiving and transmitting activities. During receiving activities 510, a WNIC may have several states including a sleep state 520, a listen state 522, and an active reception state 524. WNIC may also include a transition period 514 between sleep state 520 and listen state 522. Improved LTR for the previously mentioned states may correspond to the receiving activities 512 of the WNIC. For example, sleep state 520 may correspond to a maximum LTR duration 530. Because there is little to no activity during the sleep state, setting the LTR duration to as long as possible has little to no effect on performance and reduces power consumption. Active reception state 524 may correspond to a short LTR 534 based on throughput. For example, if WNIC is actively receiving data at its maximum throughput, LTR duration should be as short as needed to prevent a buffer overrun. Listen state 522 may be associated with an LTR duration 532 in between the LTR duration 530 of a sleep state 520 and LTR duration 534 of an active reception state 524.

During transmit activities 550, a WNIC may have several states including a sleep state 560, a pending state 562, and an active transmission state 564. WNIC may also include a transition period 554 between sleep state 560 and listen state 562. Improved LTR for the previously mentioned states may correspond to the transmitting activities 552 of the WNIC. For example, sleep state 560 may correspond to a relatively long LTR duration 570. Because there is little to no activity during the sleep state, setting the LTR duration to as long as possible has little to no effect on performance and reduces power consumption. Active transmission state 564 may correspond to a short LTR 574 based on throughput. For example, if WNIC is actively transmitting data at its maximum throughput, LTR duration should be as short as needed to prevent a buffer overrun. Transmission pending state 562 may be associated with an LTR duration 572 in between the LTR duration 570 of a sleep state 560 and LTR duration 574 of an active reception state 564.

A wireless communication device or WNIC may be in different operational states as described with respect to FIG. 5. From the latency tolerance perspective, the WNIC may be in a sleep state, listen state, pending transmission state, active reception state, or active transmission state as described in more detail below.

In a sleep state, the WNIC device may be in a power saving mode. The wireless communication device has notified a Wi-Fi Access Points (AP) or Base Transceiver Station (BTS) to withhold any incoming (Rx direction) frames for the specific device and there is no traffic from the application processor side (Tx direction). The WNIC may still be receiving occasional beacon frames and perform beacon processing from the AP/BTS, for network connectivity maintenance. However, no payload traffic is expected in this state.

In a reception listen state, the WNIC device is active and is sensing the air medium with no active payload traffic transmission or reception. The WNIC spends most of its time in this state.

In an active receiving state, the WNIC device is actively receiving payload traffic in the upstream (Rx) direction and frequently accessing the DRAM for payload storage. The platform may concurrently be in an active (shallow C-state residencies) power state and have an open path to DRAM.

In a pending transmission state, the WNIC device may have pending downstream (Tx) traffic as indicated by a host driver. However, the air medium is busy and no actual transmission can take place. In this state, the platform may be active and have an open path to DRAM.

In an Active transmission state, the WNIC device may be actively transmitting downstream payload traffic and frequently accessing the DRAM for payload retrieval. The platform is in active (shallow) power state and have an open path to DRAM.

All the states described above assume a fully on state, such as a D0 operation state, of the device, in terms of a PCIe device software model states. When the device is placed in PCIe D3 state, the device reports an unconstrained LTR. For example, an infinite LTR duration, as mandated by PCIe specifications.

In terms of the latency tolerance, the following LTR types can be defined, with respect to the WNIC states previously described. The different LTR types are listed from longest duration to shortest duration based on data throughput requirements.

Maximum LTR may be associated with a sleep state of a WNIC device. If a WNIC device spends most of its time in sleep state, the LTR duration can be set as infinite because no data is being read from or written to DRAM. In the sleep state there are no latency requirements, since there is no active traffic in any direction. The LTR duration may be defined as an unconstrained or given a maximum duration with minimum power requirements in order to achieve deepest platform power state. There may be an optional extended PCI Express Latency Tolerance Reporting (LTR) Capability, used for maximum platform latency information for components. For example, a PCIe specification may define an LTR Capability (PCIe base spec, chapter 7.8.2), that may include a definition of maximum latency of the platform that a device should request in the D0 state.

Long LTR may be associated with a listen state of a WNIC device. If a WNIC is in a Rx listen state. During a listen state, there is no payload traffic and no DRAM access and the platform may enter its deepest state or in its most idle state and reduce its power. For example, a deeper platform sleep state such as a higher C-state with more residency in this state. However, the WNIC device may require the platform to be in relatively shallower power state, to be able to receive the potential Rx payload traffic, when needed. This condition is an important optimization point for platform power.

Medium LTR may be associated with a pending transmission state of a WNIC device. If a WNIC has a pending Tx state the platform may be in relatively shallow state to process the pending downstream traffic. The transmission may be pending because it is unable to be transmitted due to busy medium conditions. This condition may persist for relatively long time and is another important optimization point for the platform power. While waiting for medium to become available, the platform shall be allowed to enter the deepest state, while preserving the capability to serve the transmission, as soon as the medium frees up.

Short LTR may be associated with an active reception (Rx) or transmission (Tx) state of a WNIC device. During active Rx or Tx the DRAM is frequently accessed and the opportunities for platform power savings are limited. There is a continuously open path between the WNIC device and DRAM. The actual data rate of payload traffic may be used to determine the LTR duration value. No estimations are required because the WNIC device measures the actual data rate of the payload traffic.

The LTR type names Long, Medium, and Short are symbolic in nature and do not represent the actual value of the latency tolerance reporting. The WNIC may use various methods of determine a data rate. The determined data rate may be used to further determine an LTR duration value.

A WNIC device may be configured for a maximum data rate. This may also be referred to as an associated data rate. The associated data rate defines the maximum rate at which the data may be transmitted or received by the WNIC for a given connection with an AP or BTS. This rate will typically be lower than the maximum theoretical rate. The maximum theoretical rate may be determined under synthetic conditions for benchmarking and not feasible in real world scenarios. The associated data rates lead to lower fill/drain rates as compared to the theoretical rates and allow for a significant increase in the LTR duration values.

A WNIC may be configured to measure the actual data rate during active transmission and reception. The actual data rate may be defined by the real-world wireless network connection. The actual data rate is typically much lower than the maximum associated rate previously described.

For the active transmission, the actual data rate for a data stream is known prior to transmission and can be used as a drain rate in the transmission FIFO data buffer.

For active reception, the actual data rate for a data stream is not known prior to the reception of the data stream. However, a historical actual rate of previously received data streams may be used to determine a statistical average data rate. This opportunistic approach allows the extension of the reported LTR duration. There may be a rare risk of an overrun of the reception FIFO data buffer.

The associated data rate or the actual data rate may be used to determine the LTR duration value for the active Tx and Rx states.

A WNIC device may be configured with a physical layer header data rate. The physical layer header data rate may prepend the payload of the frame and require a substantial duration during Rx or Tx. The LTR duration value can consider the expected duration of the physical layer overhead and extend the LTR by that timing amount.

A WNIC device may be configured to consider an air protection duration and extend the LTR duration similar to extending an LTR duration with physical overhead layer duration. For example, in WLAN environment, clear-to-send and request-to-send messages may be used as an air protection handshake by the 802.11 wireless networking protocol to reduce frame collisions and are specifically useful for long aggregations in the air. The air protection handshake duration can be used to extend the reported LTR.

A WNIC device may be configured for a different frame size. If the frame size is smaller than the FIFO data buffer or If the frame size, or even aggregation of frames, fit completely in the local Rx or Tx FIFO data buffer, the latency tolerance is higher, since there is no dependency on the DRAM path anymore because the frame is fully contained. This is specifically relevant for receive-dominant traffic with short TCP ack stream in transmission. There may be other scenarios in which the frame size is smaller than the buffer size is relevant to determining LTR duration.

The Long and Medium LTR are where the gain in power efficiencies are the greatest. These optimization points allow the platform to enter the deepest possible power state, using least amount of power, including device C10 or even S0ix. The Short LTR duration is also addressed, benefiting from the same optimization methods.

The optimization methods using a determined data rate may be combined with the knowledge of the WNIC state to extend TLR duration.

For example, the actual data rate may be used as a baseline for LTR duration calculation and applied towards the drain-rate for Tx FIFO and the fill-rate for the Rx FIFO. This is applied to all active LTR types, such as those in which there is access to DRAM.

In real-world scenarios, where the residential backbone network may be limited, the resulting latency tolerance reporting can be significantly increased, allowing a wireless communication device to enter deeper device states such as C-state and S0ix.

In addition to data rates, the Long LTR may take the physical layer overhead into account to extend the LTR duration. For example, extend the duration by another tens of microseconds, depending on the actual associated band or protocol.

In addition to data rates, The Medium LTR may take the Air Protection duration into account as well as the physical layer overhead. This is especially true for the pending Tx state. The air protection in the Tx direction is a WNIC decision and for higher data rates such as the associated and actual data rates, the WNIC device may decide to use the air protection handshake duration to extend the LTR duration. Other factors may be used to extend LTR duration.

When the frame fits into local FIFO data buffer for (Rx or Tx, the LTR duration can remain in the Long or Medium duration without the need to transition to the Short LTR level. This is because the latency tolerance is higher and there is no risk of overrun or underrun for the specific frame.

Figure 6:
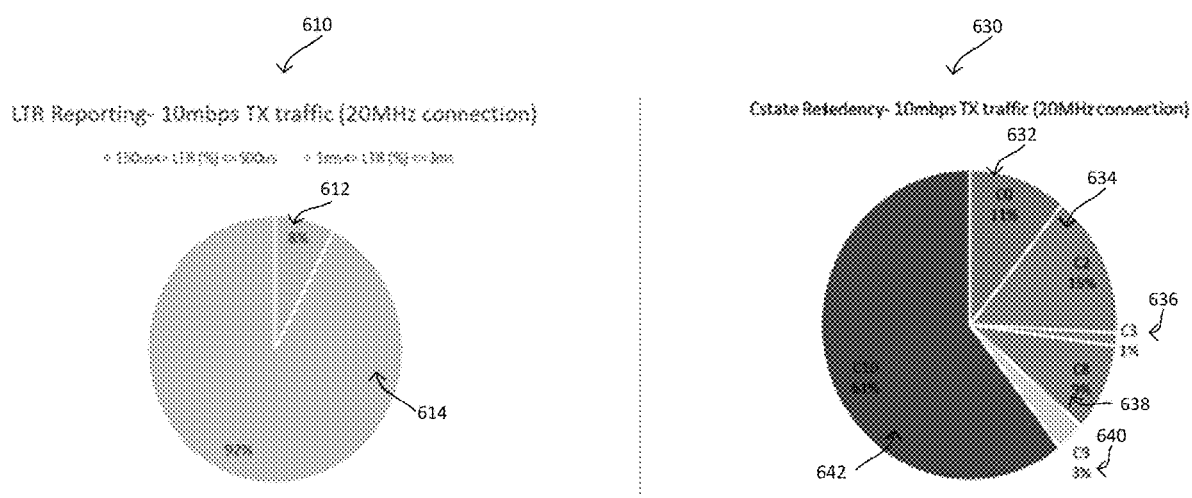
FIG. 6 shows exemplary power consumption for LTR duration based on a determined data rate according to some aspects.

FIG. 6 shows power consumption when the LTR duration is determined using the previously mentioned techniques. For example, a WNIC with 10 Mbit throughput and its associated device C-state residencies. Graph 610 shows percentages of transmission traffic a WNIC for different LTR durations. For example, 8% 612 of traffic has an LTR duration of between 150 microseconds and 500 microseconds, 92% 614 has an LTR duration between 1 millisecond and 3 milliseconds. Chart 630 shows the C-states for the same WNIC. For example, C0 state 632 makes up 11% of the WNIC's operating time. Similarly, C2 state 634 makes up 15%, C3 state 636 makes up 1%, C8 state 638 makes up 9%, C9 state 640 makes up 3%, and C10 state 642 makes up 61% of the WNIC's time. This is a significant improvement as compared to FIG. 3.

The proposed method of latency tolerance reporting shows significant improvements in platform power management as shown in FIG. 6. Using a WLAN 20 MHz connection with 10 mbps actual data rate, the platform resides in the deepest power state C10 for most of the time.

Alternatively, one or more of the previously mentioned methods may be based on hardware or firmware. Both the host based and media access control (MAC) based implementations may be based on hardware or firmware mechanisms. The host based implementation may include writing pointer triggers for short (pending transmission) LTR based on an update of the transmit frame descriptor (TFD). The MAC based implementation may include direct memory access (DMA) knowledge based on need to fetch more data from the DRAM. The MAC based mechanism may only send the short/pending transmission LTR for active queues. For host based and MAC implementations, when the driver updates the TFD write pointer, the platform is guaranteed to be awake, and the LTR update takes place without the penalty of waiting for the previous LTR requested value. This enables the WNIC to be at an intermediate LTR duration during Rx listen state, instead of the intermediate Tx pending LTR duration. Rx listen LTR duration is typically much longer than the pending TX LTR duration.

The listen state may be the most time-consuming state for the WNIC device. In this state the WNIC device is ready to transmit or receive at any given time. The LTR for the listen state may be the minimum between Rx LTR calculation (ready to receive) and the Tx LTR calculation (ready to transmit). There may only be a single LTR sent per device which describes latency tolerance for both directions (listening and receiving). In an active WNIC state, there may be a situation where there is a pending TX at the same time as a listen state for Rx. In this case, the actual LTR is the minimum between these two directions.

Since the device Rx FIFO buffers tend to be much bigger than the Tx FIFO buffers the actual LTR duration for the Tx LTR is very short as compared to the LTR duration for Rx LTR. Therefore, the reported LTR duration value is very short over long time periods.

Figure 7:
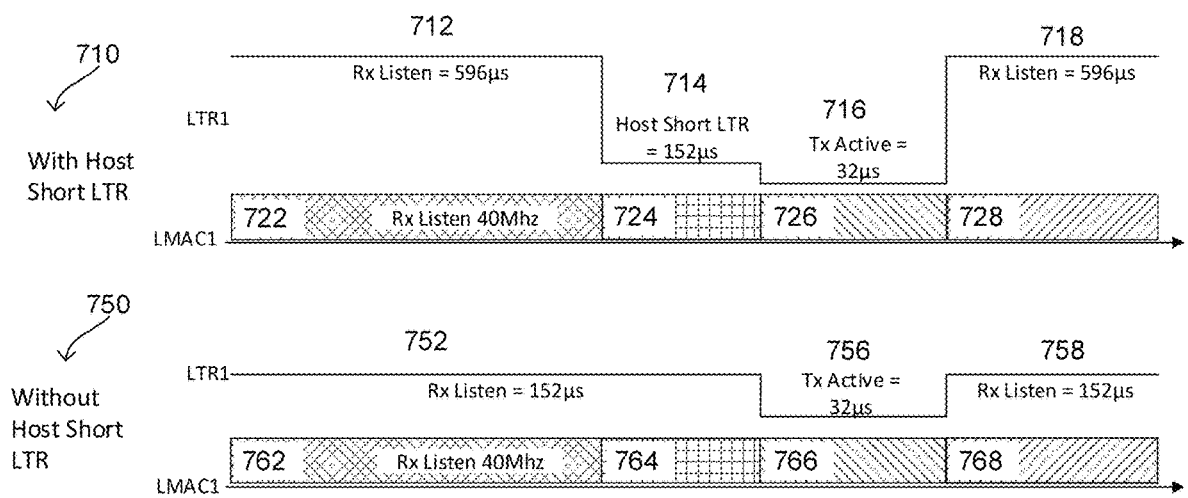
FIG. 7 shows exemplary LTR durations for different WNIC states for both transmission and reception states according to some aspects.

FIG. 7 shows exemplary short LTR durations for different WNIC states for both transmission and reception. LTR durations 710 show hardware-based examples. LTR 712 is 596 microseconds for listen state 722. LTR 714 is 152 microseconds for a pending transmission state 724. LTR 716 is 32 microseconds for an active transmission state 726. LTR 718 goes back to 596 microseconds for returning to the listen state 728.

As seen in FIG. 7, Rx based LTR is high (596 uSec) while Tx based LTR is low (152 uSec). Using this tendency, high LTR duration values may be reported during the listen state when it could not be reported in non-host-based examples.

LTR durations 750 show non host-based examples. LTR 752 is 152 microseconds for listen state 762 and pending transmission state 764. LTR 756 is 32 microseconds for an active transmission state 766. LTR 758 goes back to 152 microseconds for returning to the listen state 768.

Host based Short LTR may be reported by the hardware components after TFD write pointer is written by the driver designating a pending Tx. This allows the LTR duration for a listen state to be set without concern of underruns for New Tx or TB frame. Short LTR duration values may be set to a value greater than the LTR duration value for an active transmission state.

Figure 8:
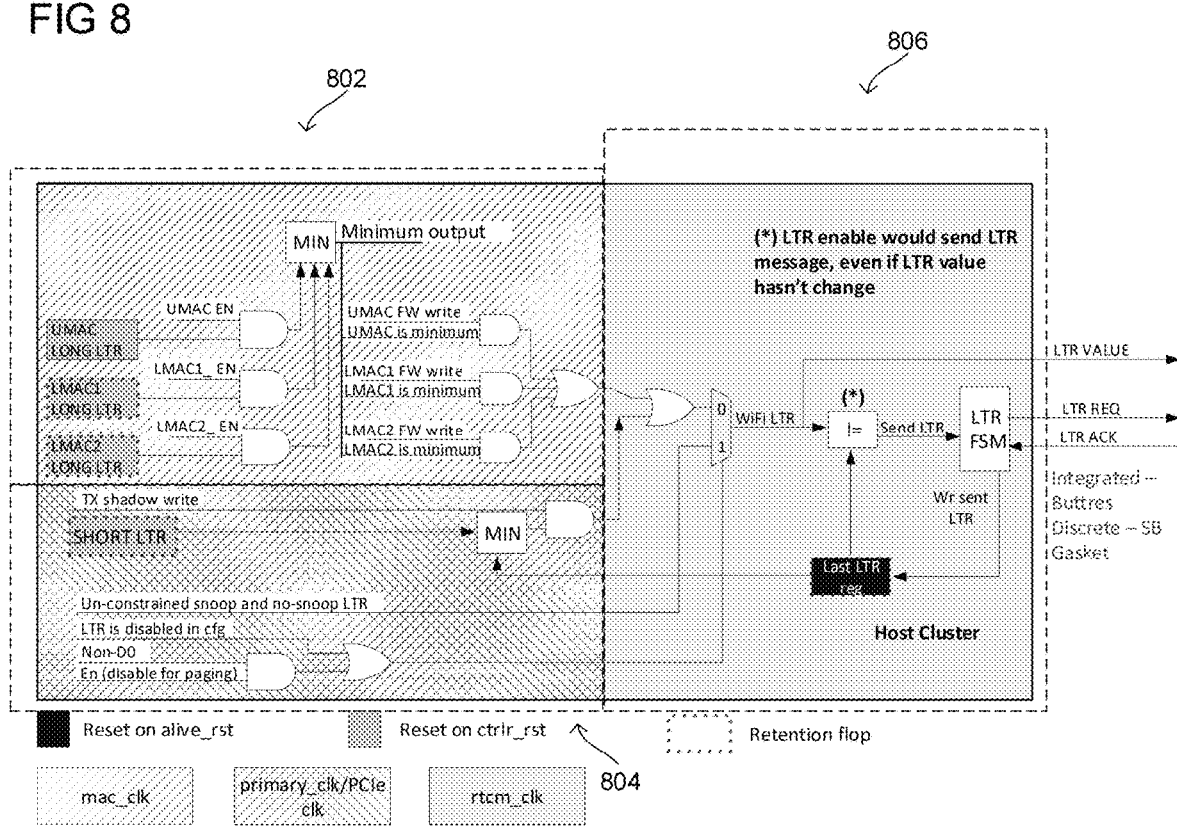
FIG. 8 shows an exemplary hardware configuration for determine LTR duration according to some aspects.

FIG. 8 shows a hardware configuration which allows the WNIC device to differentiate between Rx based LTR and Tx based LTR. The mechanism detects access from host to the device (while the host and DRAM are active) and immediately reports a low LTR which is accepted immediately and does not need to suffer from long transition time.

The hardware configuration may include sublayer 802 representing a MAC sublayer as shown in FIG. 8. The MAC sublayer 802 may include information regarding the difference between an Rx LTR and a Tx LTR and additionally report the short LTR based on pending DRAM transactions. The MAC sublayer 802 may make the determination through a combination of logic gates as shown in FIG. 8. MAC sublayer 802 may also remove software (SW) reports when they are not needed. The report may include information regarding if any DRAM transactions are required. If DRAM transactions are required the reports includes a short LTR duration. Otherwise the report includes a high LTR duration.

Host 804 based reports may include a reception LTR duration. The host 804 may determine the reception LTR duration using a combination of logic gates as shown in FIG. 8. The host 804 may forward the reception LTR duration to WNIC 806. WNIC 806 may compare the reception LTR duration to a transmission LTR duration and differentiate between the two.

FIG. 9 shows the improvements in LTR duration values for MAC based LTRs 950 as compared to host based LTRs 910. Host based short LTR 910 durations for different WNIC states for both transmission and reception. LTR 912 is 596 microseconds for listen state 922. LTR 914 is 152 microseconds for a pending transmission state 924. LTR 916 is 32 microseconds for an active transmission state 926. LTR 918 goes back to 596 microseconds for returning to the listen state 928. The device may remain in a pending transmission state until active transmission state 924 begins. However, the device may not have information to recognize if there is still more data in DRAM.

MAC based short LTR durations 950 for different WNIC states for both transmission and reception. LTR 952 is 596 microseconds for listen state 962. LTR 956 is 32 microseconds for only a small portion of the pending transmission state 964. LTR 958 goes back to 596 microseconds for the remaining of pending transmission state 964 and active transmission state 966 and listen state 968. The device may receive information regarding if there is more data waiting to be transmitted in DRAM. Based on the size of data pending, the device may choose a state. For example, if the packet is short (less than the FIFO buffer size) the device moves to Rx listen 958 even during active Tx 966.

FIG. 10 illustrates an exemplary method of determining data rate based LTR duration according to some aspects. FIG. 10 shows exemplary method 1000. As shown in FIG. 10, method 1000 includes determining a device state (stage 1002); determining a data rate of a signal (stage 1004); determining a latency tolerance value based on the data rate and the device state (stage 1006); and generating a message comprising the latency tolerance value (stage 1008).

In the following, various aspects of the present disclosure will be illustrated:

In Example 1 a device including one or more processors configured to determine a device state; determine a data rate of a signal; determine a latency tolerance value based on the data rate and the device state; and generate a message comprising the latency tolerance value.

In Example 2, the subject matter of Example 1, may optionally further include wherein the device state is a sleep state; and wherein the device is not configured to process the signal.

In Example 3, the subject matter of Examples 1 or 2, may optionally further include wherein the latency tolerance value is a maximum latency tolerance value.

In Example 4, the subject matter of any one of Examples 1 to 3, may optionally further include wherein the device state is a listen state configured to scan for the signal.

In Example 5, the subject matter of any one of Examples 1 to 4, may optionally further include wherein the signal is a received signal.

In Example 6, the subject matter of any one of Examples 1 to 5, may optionally further include wherein the device state is a reception state configured to process the received signal.

In Example 7, the subject matter of any one of Examples 1 to 6, may optionally further include wherein the device is further configured to store a data rate value of a plurality of previously received signals; and determine an average data rate of the stored data rate values of the plurality of previously received signals.

In Example 8, the subject matter of any one of Examples 1 to 7, may optionally further include wherein the data rate is the average data rate.

In Example 9, the subject matter of any one of Examples 1 to 8, may optionally further include wherein the device state is a pending state configured to queue the signal before transmitting the signal.

In Example 10, the subject matter of any one of Examples 1 to 9, may optionally further include wherein the signal is a transmitted signal.

In Example 11, the subject matter of any one of Examples 1 to 10, may optionally further include wherein the device state is a transmission state configured to transmit the signal.

In Example 12, the subject matter of any one of Examples 1 to 11, may optionally further include wherein the data rate is a transmission drain rate.

In Example 13, the subject matter of any one of Examples 1 to 12, may optionally further include wherein the one or more processors are further configured to obtain a data rate threshold; and determine that the data rate exceeds the data rate threshold.

In Example 14, the subject matter of any one of Examples 1 to 13, may optionally further include wherein the maximum data rate is an associated data rate between the device and an access point.

In Example 15, the subject matter of any one of Examples 1 to 14, may optionally further include wherein the maximum data rate is an associated data rate between the device and a base transceiver station.

In Example 16, the subject matter of any one of Examples 1 to 15, may optionally further include wherein the latency tolerance value is further based on a duration of processing a physical layer.

In Example 17, the subject matter of any one of Examples 1 to 15, may optionally further include wherein the latency tolerance value is further based on a duration of a handshake between the device and an access point.

In Example 18, the subject matter of any one of Examples 1 to 15, may optionally further include wherein the latency tolerance value is further based on a duration of a handshake between the device and base transceiver station.

In Example 19, the subject matter of any one of Examples 1 to 18, may optionally further include wherein the one or more processors are further configured to determine a signal frame size.

In Example 20, the subject matter of any one of Examples 1 to 19, may optionally further include wherein the signal frame size is smaller than a device data buffer size.

In Example 21, the subject matter of any one of Examples 1 to 20, may optionally further include wherein the data rate is the maximum data rate.

In Example 22, a device including a memory configured to store instructions; one or more processors coupled to the memory to execute the instructions stored in the memory, wherein the instructions are configured to: determine a device state; determine a data rate of a signal; determine a latency tolerance value based on the data rate and the device state; and generate a message comprising the latency tolerance value.

In Example 23, the subject matter of Example 22, may optionally further include any one of the devices of Examples 1 to 21.

In Example 24, a method including determining a device state; determining a data rate of a signal; determining a latency tolerance value based on the data rate and the device state; and generating a message comprising the latency tolerance value.

In Example 25, the subject matter of Example 24, may optionally further include wherein the device state is a sleep state; and pause processing the signal.

In Example 26, the subject matter of any one of Examples 24 or 25, may optionally further include wherein the latency tolerance value is a maximum latency tolerance value.

In Example 27, the subject matter of any one of Examples 24 to 26, may optionally further include wherein the device state is a listen state configured to scan for the signal.

In Example 28, the subject matter of any one of Examples 24 to 27, may optionally further include wherein the signal is a received signal.

In Example 29, the subject matter of any one of Examples 24 to 28, may optionally further include wherein the device state is a reception state configured to process the received signal.

In Example 30, the subject matter of any one of Examples 24 to 29, may optionally further include storing a data rate value of a plurality of previously received signals; and determining an average data rate of the stored data rate values of the plurality of previously received signals.

In Example 31, the subject matter of any one of Examples 24 to 30, may optionally further include wherein the data rate is the average data rate.

In Example 32, the subject matter of any one of Examples 24 to 31, may optionally further include wherein the device state is a pending state configured to queue the signal before transmitting the signal.

In Example 33, the subject matter of any one of Examples 24 to 32, may optionally further include wherein the signal is a transmitted signal.

In Example 34, the subject matter of any one of Examples 24 to 33, may optionally further include the device state is a transmission state configured to transmit the signal.

In Example 35, the subject matter of any one of Examples 24 to 34, may optionally further include wherein the data rate is a transmission drain rate.

In Example 36, the subject matter of any one of Examples 24 to 35, may optionally further include obtaining a data rate threshold; and determining that the data rate exceeds the data rate threshold.

In Example 37, the subject matter of any one of Examples 24 to 36, may optionally further include wherein the maximum data rate is an associated data rate of an access point.

In Example 38, the subject matter of any one of Examples 24 to 37, may optionally further include wherein the maximum data rate is an associated data rate of a base transceiver station.

In Example 39, the subject matter of any one of Examples 24 to 38, may optionally further include wherein the latency tolerance value is further based on a duration of processing a physical layer.

In Example 40, the subject matter of any one of Examples 24 to 39, may optionally further include wherein the latency tolerance value is further based on a duration of a handshake between the device and an access point.

In Example 41, the subject matter of any one of Examples 24 to 40, may optionally further include wherein the latency tolerance value is further based on a duration of a handshake between the device and base transceiver station.

In Example 42, the subject matter of any one of Examples 24 to 41, may optionally further include determining a signal frame size.

In Example 43, the subject matter of any one of Examples 24 to 42, may optionally further include wherein the signal frame size is smaller than a device data buffer size.

In Example 44, the subject matter of any one of Examples 24 to 43, may optionally further include wherein the data rate is the maximum data rate.

In Example 45, a system including one or more devices according to claims 1 to 23 configured to implement a method according to claims 24 to 44.

In Example 46, one or more non-transitory computer readable media including programmable instructions thereon, that when executed by one or more processors of a device, cause the device to perform any one of the method of claims 24 to 44.

In Example 47, a means for implementing any of the claims 1 to 23.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature and are thus understood as capable of being implemented in a corresponding device. Likewise, it is appreciated that implementations of devices detailed herein are understood as capable of being implemented with a corresponding method. It is thus understood that a device corresponding to a method detailed herein may include one or more components configured to perform each aspect of the related method.

All acronyms defined in the above description additionally hold in all claims included herein.

What is claimed is:

1. A method comprising:
   determining a device state of a device;
   determining a data rate of a signal, wherein the data rate comprises a maximum data rate of an access point associated with the device;
   determining a latency tolerance value based on the data rate, a duration of a handshake between the device and the access point, and the device state; and
   generating a message comprising the latency tolerance value.

2. The method of claim 1, wherein the data rate is a transmission drain rate.

3. The method of claim 1, further comprising:
   obtaining a data rate threshold; and
   determining that the data rate exceeds the data rate threshold.

4. The method of claim 1, further comprising determining a signal frame size.

5. The method of claim 4, wherein the signal frame size is smaller than a device data buffer size.

6. A device comprising one or more processors configured to:
   determine a device state of a device;
   determine a data rate of a signal, wherein the data rate comprises a maximum data rate of a base transceiver station associated with the device;
   determining a latency tolerance value based on the data rate, a duration of a handshake between the device and the base transceiver station, and the device state; and
   generate a message comprising the latency tolerance value.

7. The device of claim 6, wherein the latency tolerance value is a maximum latency tolerance value.

8. The device of claim 6, wherein the device state is a listen state configured to scan for the signal.

9. The device of claim 6, wherein the signal is a received signal.

10. The device of claim 9, wherein the device state is a reception state configured to process the received signal.

11. The device of claim 10, wherein the device is further configured to store a data rate value of a plurality of previously received signals; and determine an average data rate of the stored data rate values of the plurality of previously received signals.

12. The device of claim 11, wherein the maximum data rate is an average maximum data rate.

13. The device of claim 6, wherein the device state is a pending state configured to queue the signal before transmitting the signal.

14. The device of claim 6, wherein the signal is a transmitted signal.

15. The device of claim 14, where the device state is a transmission state configured to transmit the signal.

* * * * *

UNITED STATES PATENT AND TRADEMARK OFFICE
CERTIFICATE OF CORRECTION

| | | |
|---|---|---|
| PATENT NO. | : 12,199,849 B2 | Page 1 of 1 |
| APPLICATION NO. | : 17/128327 | |
| DATED | : January 14, 2025 | |
| INVENTOR(S) | : Michael Shusterman et al. | |

It is certified that error appears in the above-identified patent and that said Letters Patent is hereby corrected as shown below:

On the Title Page

Item (72) Inventors, Line 2:
Change "Rom Leor" to --Leor Rom--

Signed and Sealed this
Sixth Day of May, 2025

Coke Morgan Stewart
*Acting Director of the United States Patent and Trademark Office*